Dec. 10, 1940.   F. EISELE   2,224,257
MECHANISM FOR ELIMINATING BACKLASH
Filed Oct. 5, 1937   4 Sheets-Sheet 1
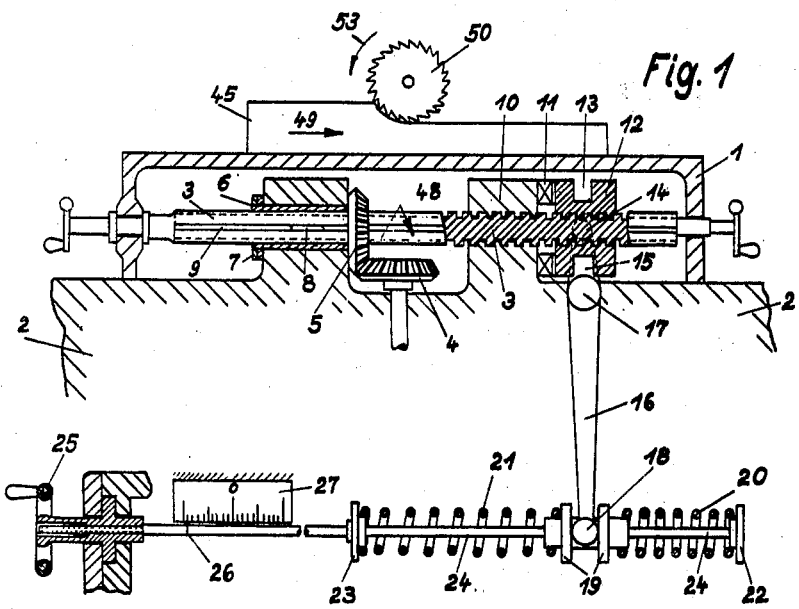
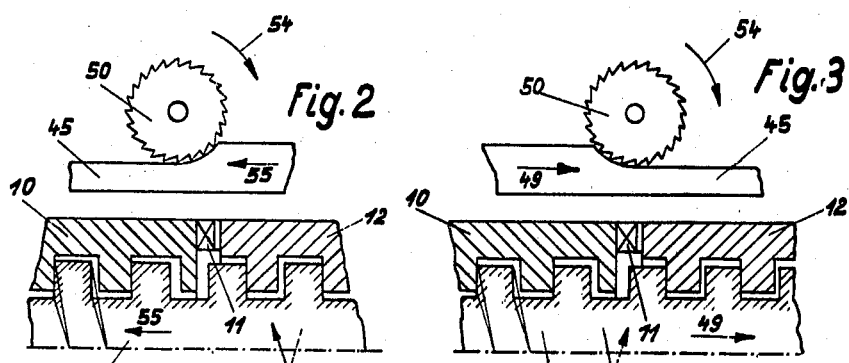
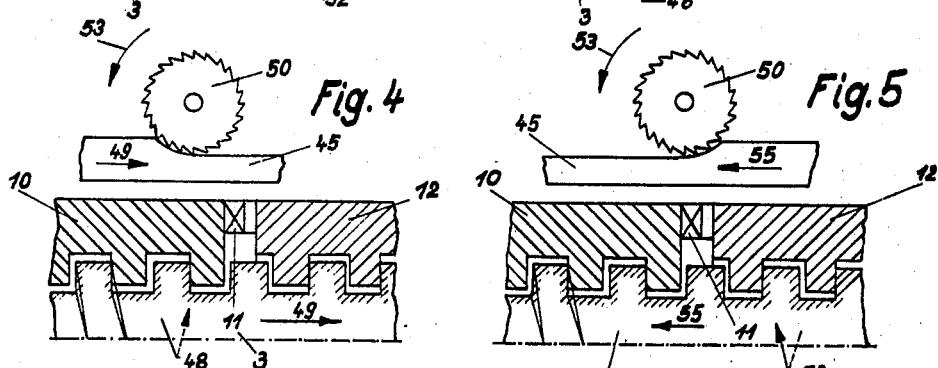
Inventor: Felix Eisele Dec. 10, 1940.  F. EISELE  2,224,257
MECHANISM FOR ELIMINATING BACKLASH
Filed Oct. 5, 1937  4 Sheets-Sheet 2
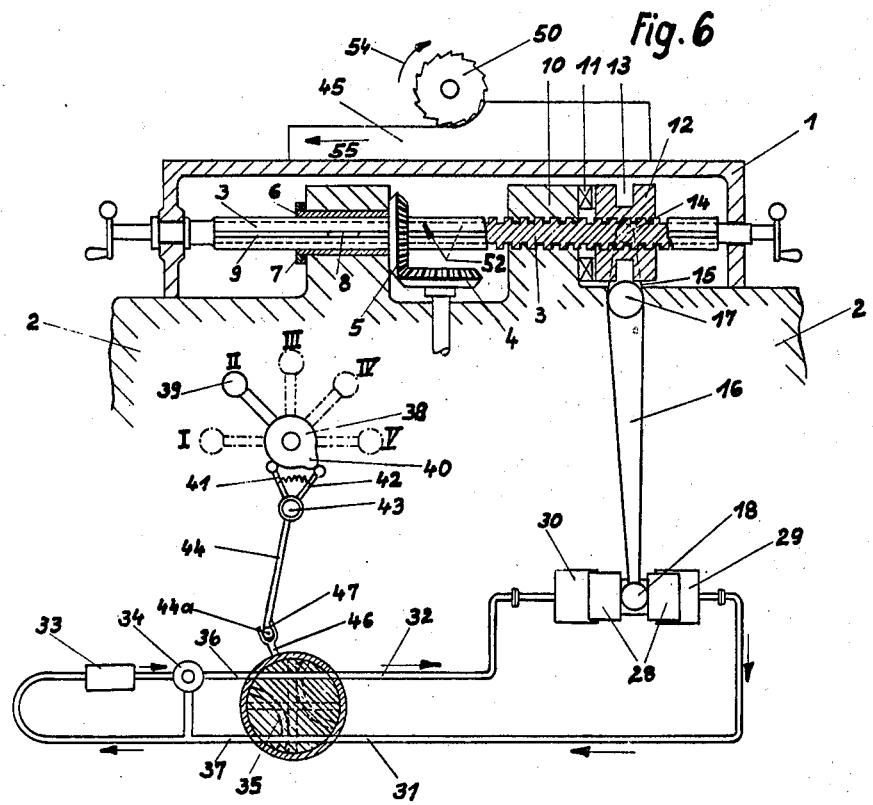
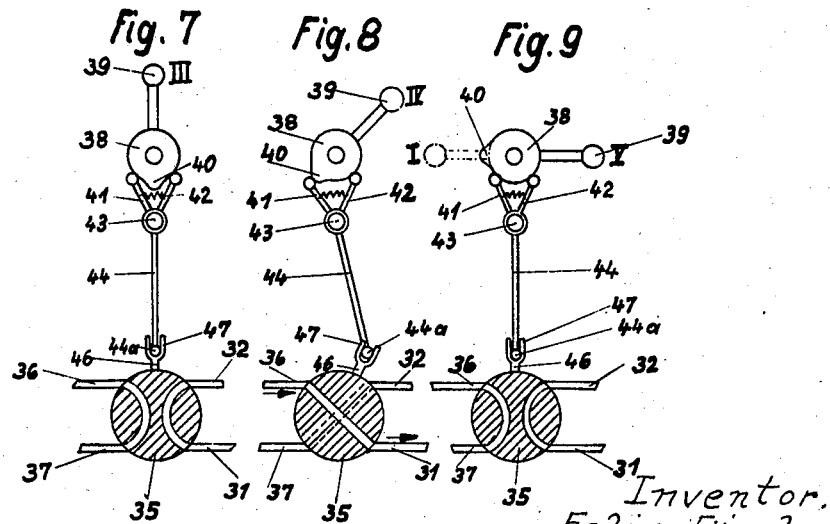
Inventor.
Felix Eisele
By Young Emery + Thompson
Attorneys Dec. 10, 1940.  F. EISELE  2,224,257

MECHANISM FOR ELIMINATING BACKLASH

Filed Oct. 5, 1937   4 Sheets-Sheet 3

Inventor:
Felix Eisele
By Young Emery + Thompson
Attorneys

Dec. 10, 1940.   F. EISELE   2,224,257
MECHANISM FOR ELIMINATING BACKLASH
Filed Oct. 5, 1937   4 Sheets-Sheet 4

Inventor:
Felix Eisele
By Young Emery + Thompson
Attorneys

Patented Dec. 10, 1940

2,224,257

UNITED STATES PATENT OFFICE 2,224,257

MECHANISM FOR ELIMINATING BACKLASH

Felix Eisele, Rabenstein, near Chemnitz, Germany, assignor to Wanderer-Werke vorm. Winklhofer & Jaenicke Akt.-Ges., Siegmar-Schonau, Germany.

Application October 5, 1937, Serial No. 167,464
In Germany October 8, 1936

14 Claims. (Cl. 90—22)

This invention relates to mechanism for eliminating back-lash in machine parts driven by means of a screw and nut, for example, slides of machine tools, particularly milling machines, in which there cooperate with the screw spindle a main nut and an auxiliary nut movable relatively to the main nut.

Mechanisms of this kind have been proposed in which the auxiliary nut is connected to the main nut by yielding connections which exert a pressure on the auxiliary nut in the direction of movement of the slide or table. These mechanisms have the disadvantage that they are operative in one direction only. It has also been proposed to rotate the auxiliary nut relatively to the main nut by screw thread means so that by displacing the screw thread of the auxiliary nut relatively to the screw thread of the main nut, elimination of backlash takes place. This arrangement has the disadvantage that owing to the self-locking in the screw threads, differences in the magnitude of backlash caused, for example, by unequal wear or inaccurate machining of the screw spindle, are not automatically compensated whereby at such places as show negative differences in pitch there occurs abrasion and rapid wear at the screw threads of the spindle and of the nut. These disadvantages of the proposed mechanisms had as a result that they were not effectively realized. In the case of high power drives, such as are used, for example, in machine tools, mechanisms of the type mentioned heretofore were of no utility.

The present invention has for its object to avoid the disadvantages of these prior proposals and to provide a mechanism which can satisfy the most different speed and operation conditions, and which will automatically eliminate backlash in a simple and reliable manner and in both directions of operation of the driven machine parts.

According to the present invention, the auxiliary nut is non-rotatable relatively to the main nut and can be actuated in the axial direction relatively to the main nut by a power means which is selectively actuable in one or the other direction.

The mechanism embodying the invention is illustrated by way of example in the drawings, in which:

Figure 1 is a longitudinal section of the mechanism applied to a machine drive.

Figs. 2, 3, 4 and 5 illustrate diagrammatically various modifications.

Fig. 6 illustrates another modification of the mechanism in a section similar to that of Fig. 1.

Figs. 7, 8 and 9 show a detail of Fig. 6 in different working positions.

Figure 10:
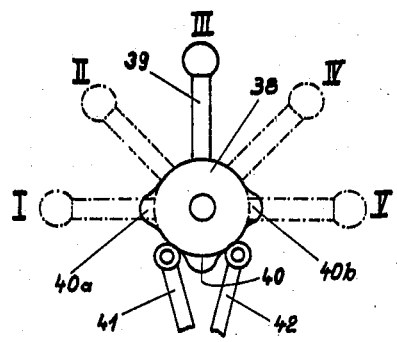
Figs. 10 and 11 illustrate a modification of a detail of the mechanism according to Fig. 6, in side and top views respectively.

The mechanism according to the invention is illustrated in the drawings as applied to the drive of the reciprocable work-table of a milling machine. The invention is explained with the aid of various modes of drive and operation in such a machine. Obviously, however, the mechanism according to the invention is applicable to machine tools of other kinds and can be used quite generally for machine tool drives of the type in question.

Fig. 1 shows a milling machine work-table 1, supporting a work-piece 45, which table is longitudinally slidable on a base 2. The table is driven by a motor gear set, not shown, or in any other manner. The drive is effected through a shaft 3 which is journaled for rotation but not longitudinal sliding in the table 1, and is rotated through gears 4, 5. The gear 5 is fast on a sleeve 6 rotatably journaled in the base 2 and secured against axial sliding by collar 7 on the sleeve. The power transmission from the gear 5 to the shaft 3 is effected by means of a feather or key 8 fast on the sleeve 6 which feather is guided in a longitudinal slot 9 in the shaft 3. The shaft 3 has screw threads which engage a nut 10 fixed on the base 2 whereby the shaft 3 in its rotation has a screw motion in the nut 10 and thus the shaft 3 together with the table 1 move longitudinally to the right or to the left according to the direction of rotation of the shaft. Obviously the arrangement may be reversed, the shaft being connected to the stationary part, and the nut to the movable machine part, or the nut may be rotatable and the shaft may be fixed.

To eliminate backlash between the nut 10 which is the main nut, and the shaft 3, there is provided an auxiliary nut 12, the threads of which also engage the threads of the shaft 3, which auxiliary nut 12 is non-rotatably connected to the main nut 10 by clutch jaws 11 but can slide relatively to the nut 10 in the axial direction of the shaft 3. The auxiliary nut 12 can move in both directions, that is, away from the main nut 10 and towards the said nut. This sliding movement is effected by a power means which is operable selectively in one direction or the other in such a manner that in both directions of movement of the table 1 the screw threads of the auxiliary nut 12 are always pressed against the threads on the shaft 3 in the opposed direction relatively to the threads of the nut 10. The direction of sliding of the auxiliary nut 12 and the magnitude of the force with which its threads must be pressed against the threads of the shaft 3, depend upon the different modes of operation of the machine.

On rotation of the shaft 3 in the direction of the arrow 52, Figs. 2 and 5, the shaft 3 and therefore also the table 1 with the work-piece 45 are pushed in the direction of the arrow 55. Usually, as shown in Fig. 5, the right-hand flanks of the screw threads of the shaft 3 bear against the threads of the main nut 10 and effect the feed motion of the shaft 3. If this feed motion takes place in opposition to the action which the tool 50, rotating in the direction of the arrow 53, exerts on the work-piece 45, then due to this action backlash between the threads of the shaft 3 and those of the nut 10 will not occur or will occur only to a small extent, on fluctuations in the power. In order to prevent even the slightest backlash in this case, the auxiliary nut 12 must be moved away from the main nut 10 so that the auxiliary nut 12 will always exert a certain pull on the shaft 3 against its direction of feed (arrow 55). In this case however, a small effort of the auxiliary nut and the shaft 3 is sufficient.

If now the tool 50 should rotate in the direction of the arrow 54, Fig. 2, the direction of movement of the table being in the direction indicated by the arrow 55, then the tool 50 tends to pull the work-piece 45 in the direction of feed of the table 1. Under these conditions, as will be seen from Fig. 2, the left-hand flank of the threads of the shaft 3 bear against the threads of the main nut 10. In the event of fluctuations in the action of the tool 50 and the work-piece or of interruptions of this action with simultaneous continued rotation of the shaft 3, movement of the shaft relatively to the nut 10 can take place to the extent of the play existing between the threads of the parts 3 and 10. The table 1 with the work-piece 45 could thus be fed non-uniformly and a sudden increase in resistance might cause breakage of the tool 50. To prevent this, under such conditions, the auxiliary nut 12 must be shifted to the left and with such effort that the left-hand flanks of the threads of the shaft 3 will always bear against the threads of the nut 10. Thereby impacts exerted by the tool 50 on the work-piece 45 and thus on the table 1 and the shaft 3, will always be taken up by the fixed main nut 10, so that a uniform feed is guaranteed.

In similar manner the auxiliary nut 12 has to be moved with comparatively lesser effort to the left (Fig. 3) or with greater effort to the right (Fig. 4), when, on the contrary, the shaft 3 rotates in the direction of the arrow 48 and the work-tool 50 turns in different directions 54, 53, and thereby shifts the table 1 to the right (arrow 49).

These different shifts of the auxiliary nut 12 are obtained in a simple and reliable manner by the controlled power means.

According to the example of Fig. 1, the power means consists of a movable member 19 acted upon in opposing directions by two springs 20, 21.

The movements of the member 19 are transmitted to the auxiliary nut 12 by means of a lever 15, 16 pivoted at 17. For this purpose the auxiliary nut 12 has a groove 13 in which engages a roller 14 on the lever arm 15. At the free end of the arm 16 there is provided a roller 18 engaging a corresponding groove in the movable power member 19. The ratio of the arms 15, 16 to each other may be such that a force exerted on the arm 16 is applied with multiplied effort to the auxiliary nut 12 but without any self-locking taking place in the opposite direction. When excessive forces are exerted, say by the shaft 3 on the auxiliary nut 12, retraction of the auxiliary nut against the action exerted on it by the power means cannot take place.

The magnitude of the effort exerted by the power means on the auxiliary nut can be adjusted, for example by adjustment of the power means itself. In the example according to Fig. 1, there are provided for this purpose movable abutments 22, 23, between which and the power member 19 the springs 20, 21 are arranged. These abutments 22, 23 can be adjusted by means of a single member, for example, a rod 24, which extends freely through the movable member 19. The rod 24 is provided with a handwheel 25 screw-threaded thereon, for this purpose of adjustment and to observe the adjustment a scale 27 may be provided cooperating with an index mark 26 on the rod 24. By shifting the rod 24 from zero position to the left, Fig. 1, the spring 20 is tensioned, and by shifting it to the right the spring 21 is tensioned, so that by means of the springs 20, 21 an effort can be exerted on the movable member 19 and consequently on the lever 15, 16 which tends to urge the lever in clockwise or counter-clockwise direction and thus operates the auxiliary nut 12 to the right or to the left respectively against the shaft 3.

The connection between the adjusting rod 24 and the abutments 22, 23 may be of the bayonet type permitting a rapid release, whereby the action of the springs 20, 21 on the movable member 19 is balanced and the lever 15, 16 is brought into zero position by means of a spring, not shown. In this zero position of the lever 15, 16 the auxiliary nut 12 is in mid position of its range of axial movement in which its threads are not in contact with, or are not pressed against the threads of the shaft 3.

Figure 15:
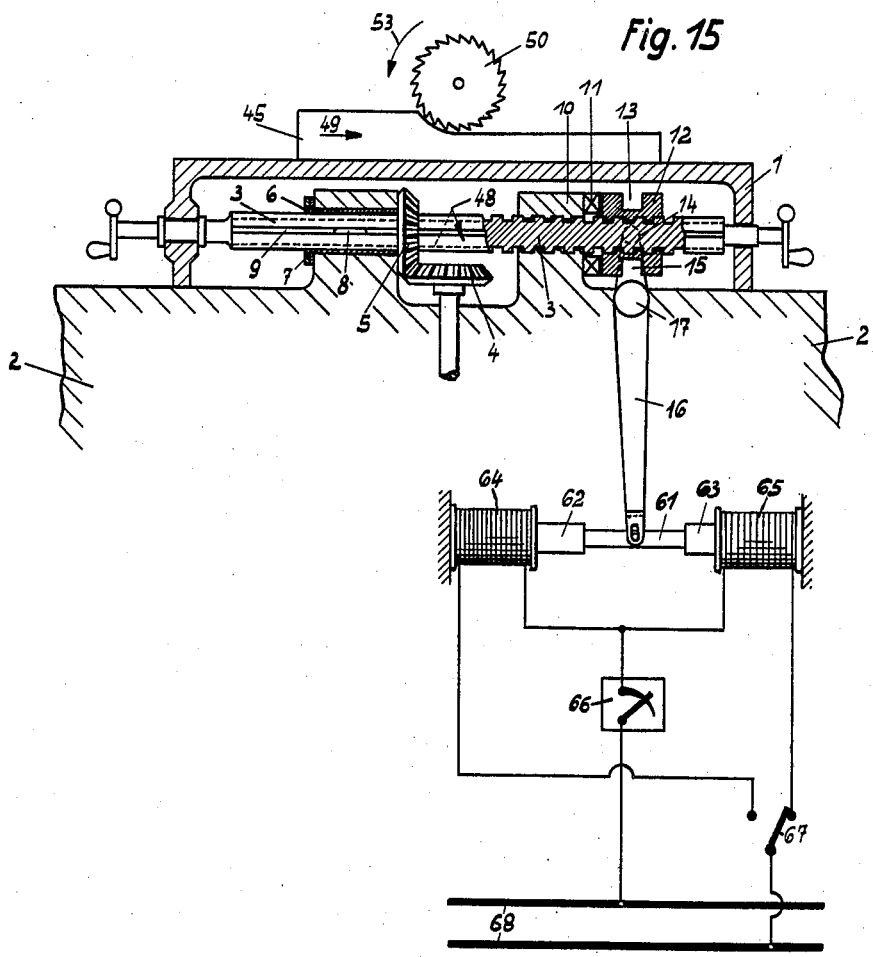
Fig. 15 illustrates a further modification of the mechanism in a section similar to that of Fig. 1.

Instead of springs 20, 21 other power members can be used. For example, the auxiliary nut 12 may be moved to the right or to the left by means of an electrically or electromagnetically operated device, and pressed with smaller or greater force, which may be adjustable, against the threads of the shaft 3. Such a mechanism is shown in Fig. 15 and described below.

In the example shown in Fig. 6, the spring actuated member 19 is replaced by a piston 28, the ends of which operate in cylinders 29, 30 and are under the action of a pressure fluid supplied to the cylinders by pipes 31, 32. The supply of pressure fluid can be delivered, for example, by means of a regulatable and reversible pump. In the construction illustrated the regulation is effected by a regulator 34 which sets up a definite fluid pressure in a conduit 36 fed by a pump 33, said regulator also allowing the excess fluid to flow into a return conduit 37. The reversal is obtained by means of a control valve 35 which may be set in its different positions either by hand or automatically by means of other control means. In Fig. 6 the control valve 35 is shown in a position in which it connects the conduit 36 with the pipe 32 and the conduit 37 with the pipe 31, so that the fluid pressure determined by the regulator 34 is operative in the cylinder 30 and tends to urge the piston 28 to the right and the lever 15, 16 in anti-clockwise direction. In this manner the auxiliary nut 12 is moved to the left with a corresponding effort. In the position of the control valve shown in Figs. 7 and 9, the conduit 36 is connected with the conduit 37, and the pipe 31 with the pipe 32 in which position the pump 33 is short circuited. Also, under these conditions the two cylinders 29, 30 are connected with each other so that the piston 28 and the lever 15, 16 assume the mid position under the action of a spring, not shown, in which the threads of the auxiliary nut 12 are not pressed against the threads of the shaft 3 in either direction.

In Fig. 8 the control valve 35 is shown in reverse position in which the conduit 36 in which the higher pressure prevails is connected to the pipe 31, and the low pressure conduit 37 is connected to the pipe 32. Under these conditions the piston 28 is moved to the left by the higher pressure in the cylinder 29 and the lever 15, 16 tends to rotate clockwise about its pivot 17 whereby the auxiliary nut 12 presses to the right against the threads of the shaft 3.

The system is so arranged and constructed that a master control can be used for regulating the working movements of the table 1, by bringing the power means into and out of operation and for selecting the direction of its action on the auxiliary nut 12. In the example shown in Fig. 6 this master control consists of the lever 39 which can be set into a number of positions. In the drawing these positions correspond to the different movements of the table 1. Position I of the lever determines rapid movement of the table to the left; position II a slower working movement of the table to the left; position III determines position of rest of the table; position IV determines a working movement of the table to the right; and position V determines a rapid movement of the table to the right.

The lever 39 may be retained in each of its various positions, against unintentional movement, by any suitable detent means not shown. The lever 39 actuates a cam disc 38 having a hump 40 which cooperates with two levers 41 and 42 which are spring held in contact with the cam. These levers 41 and 42 operate each only in one direction of movement a lever 44 pivoted at 43, the lever 41 actuating the lever 44 in anti-clockwise direction, Fig. 6, and the lever 42 operating it in clockwise direction. Both the levers 41 and 42 and also the lever 44 are under the influence of springs, not shown, which constantly tend to rotate the lever into the position shown in Figs. 7 and 9, in which the levers 41 and 42 have their free ends in contact with the circular portion of the cam 38 and the lever 44 is in midposition. The free end of the lever 44 has a roller 44a engaging in the forked end 47 of an arm 46 on the reversing valve 36 and capable of operating the same.

Thus if the table 1 is to be given a working movement to the right by shifting the lever 39 from position III into position IV, then on this operation the hump 40 of the cam 38 will move the lever 41 anti-clockwise and thereby shift the lever 44 in anti-clockwise direction, Fig. 8. The control valve 35 is thereby turned clockwise by means of the parts 44a, 47, 46 from the position of Fig. 7 to the position of Fig. 8, whereby the higher fluid pressure in the conduit 37 is effective through the pipe 31 in the cylinder 29, operating the piston 28 and the auxiliary nut 12 to the right by means of the lever 15, 16.

According to whether the tool 50 is rotating in the direction of the arrow 53 (similar directional milling according to Fig. 5) or in the direction of the arrow 54 (counter-directional milling according to Fig. 3) during this shifting movement of the table 1, the fluid pressure acting on the piston 28 is adjustable to a greater or smaller value by suitable shifting of the regulator 34. This operation of the regulator 34 may be effected manually or automatically through suitable connections during the rotation of the lever 39 or of the valve 35.

Figure 11:
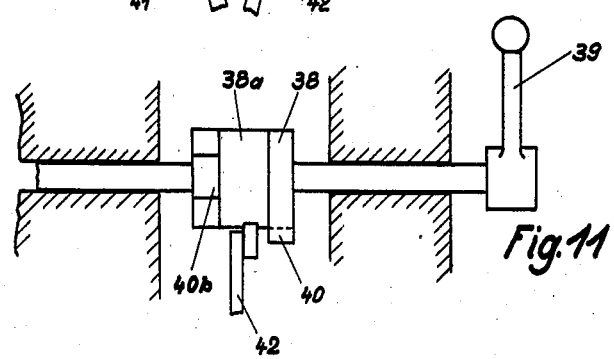

On further rotation of the control lever 39 into the position shown in Fig. 9, the hump 40 comes out of the region of action of the levers 41 and 42 whereby these can return into contact with the circular portion of the cam 38 permitting the return of the lever 44 to its midposition, so that on actuating the control lever 39 for rapid movement of the table 1, the action of the pressure fluid on the piston 28 and thus upon the auxiliary nut 12, ceases. The rapid movement of the table 1 can thus take place without the friction resistance which would exist if the auxiliary nut were under pressure. Means are also provided for enabling the control lever 39 to be operated without simultaneous actuation of the control valve 35, and which also make it possible that in one direction of movement of the control lever 39 the automatic shifting of the auxiliary nut can be effected selectively in one or the other direction. For this purpose the connection between the control lever 39 and the valve 35 is made disengageable, and the cam 38 is made capable of sliding as well as rotating relatively to the levers 41, 42. Fig. 11 shows the cam disc 38 in a position in which the levers 41, 42 lie opposite a wholly circular portion 38a of the cam disc 38 so that on turning the cam disc 38 they are not operated.

Figure 12:
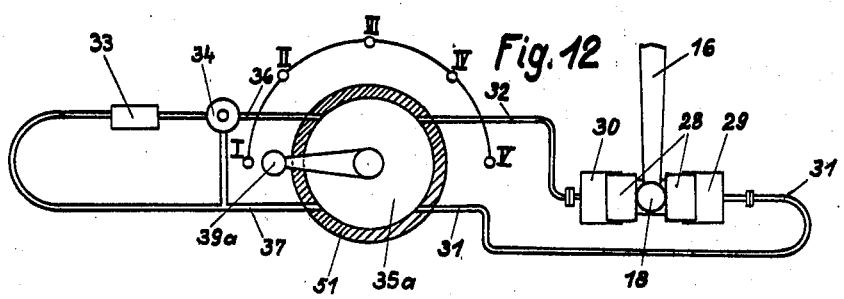
Fig. 12 is a diagrammatic view of another modification of a detail of the mechanism.
Figure 13:
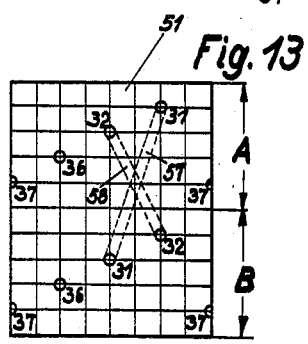
Figs. 13 and 14 illustrate diagrammatically, details of Fig. 12.

Furthermore, in the modification shown in Figs. 10 and 11 the cam disc 38 is provided with two additional humps 40a and 40b, each spaced at 90° from the hump 40. With this arrangement if the cam disc 38 is moved to the right from the position of Fig. 11, then the humps 40a, 40b come into the path of the levers 41, 42. This has for result that in turning the control lever 39 in the clockwise direction, Fig. 10, from position III into position IV, the lever 41 is no longer actuated to move the lever 44 anti-clockwise (Figs. 7 and 8), but the lever 42 is actuated by the hump 40b and consequently the lever 44 is turned clockwise. The actuation of the lever 44 by the humps 40a and 40b of the cam disc 38, instead of by the hump 40, thus has for its result that in one direction of movement of the control lever 39 the direction of rotation of the valve 35 and therefore the action of the fluid pressure on the piston 28 and the direction of movement of the auxiliary nut 12 are reversed. In the arrangement illustrated this has the advantage that the machine can be selectively adjusted for similar directional milling and for counter-directional milling by merely shifting the cam disc 38, which may be effected, for example, by a separate device and also by means of the hand lever 39. Also by actuating the said lever 39 in different directions there is automatically obtained the correct shifting of the auxiliary nut 12 corresponding to the kind of milling to be performed. Another modification of control means is shown in Figs. 12 to 14.

In this modification there is provided a rotatable and longitudinally slidable control valve plug 35a, which may be actuated, for example, by means of a lever 39a, which also serves to control the table movements. The valve plug 35a operates in a valve housing 51 to which are connected the conduits 31, 32, 36, 37. As will be seen from the development of the housing 51 shown in Fig. 13, the parts of the conduits 31, 32, 36, 37 are duplicated, appearing once in the section A and again in the section B of the housing 51. In the section B as compared with section A, the parts of the pipes 31 and 32 have their positions exchanged, by provision of separate channels 57 and 58.

Figure 14:
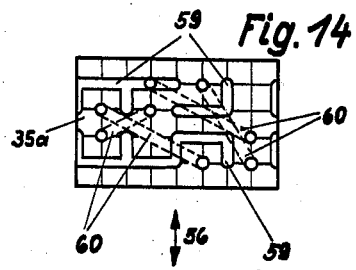

The control valve plug 35a can be longitudinally moved, in the directions of the arrows 56, Fig. 14, selectively into the section A or into the section B of the valve housing 51 and can then be rotated in the selected section. The valve plug 35a, in the manner shown in the development of Fig. 14, has channels 59 in its periphery and channels 60 extending through its body. By means of these channels 59, 60, on rotating the valve plug 35a by means of the lever 39a or otherwise, the conduits 31, 32, 36, 37 are connected with each other through the ports in the casing 51, selectively and in a manner and sequence corresponding to the example of Fig. 6.

In positions I and V (rapid movement to the right and left respectively) and also in the position III (rest position of the table 1) of the control members 39a, 35a, it will be seen that by connecting the pipe 31 with the pipe 32, and the conduit 36 with the conduit 37, the two cylinders 29 and 30 and the pump 33 are short circuited, this being effected during turning of the control valve plug 35a in the section A and in the section B, of the valve housing 51.

In the position II of the valve plug 35a corresponding to movement of the table 1 to the left, on setting the valve into the section A, the conduit 36 is connected with the pipe 32, and the conduit 37 is connected with the pipe 31 and when the valve plug is set in the section B the conduit 36 is connected with the pipe 31 and the conduit 37 with the pipe 32. In the position IV of the valve plug 35 corresponding to working movement of the table 1 to the right, with setting of the valve plug in section A, the conduit 36 is connected with the pipe 31 and the conduit 37 is connected with the pipe 32, while with setting of the valve plug in section B, the conduit 36 is connected with the pipe 32 and conduit 37 with the pipe 31.

Setting of the valve plug in section A thus corresponds to similar directional milling in which the auxiliary nut is pressed by the piston 28 in the movement of direction of the table 1, whereas setting of the valve plug in the section B corresponds to counter-directional milling in which the action of the auxiliary nut 12 by means of the piston 29 is opposite to the direction of movement of the table.

By simply shifting the valve plug 35 according to the arrow 56, Fig. 14, from one control section of the housing 51 into the other section, the machine can thus be selectively set for similar directional milling and counter-directional milling in which connection the mode and direction of actuation of the control lever 39a, which determines the direction and speed of movement of the table 1 remain similar in both settings of the machine. Connection of the control lever 39a with the valve plug 35a may also be made disengageable so that after setting the valve plug 35a to either position, the lever 39a can be freely operated to control the table movement.

In the modification shown in Fig. 15 two electromagnets are provided for moving the auxiliary nut 12. The lever 16 carries on its end pivotally connected thereto a bar 61. On the ends of the bar 61 two magnetic cores 62, 63 are provided, which engage with the stationary magnet-coils 64, 65. The magnetic force of the coils 64, 65 may be regulated by means of the rheostat 66. The switch 67 serves to connect either of the coils 64, 65 to a source of current represented by the main line 68.

Milling machines selectively operable for similar directional and counter directional movement, and in both directions of movement of the table carrying the work-piece, also the possibility of obtaining frictionless rapid movement of the table in both directions, are thus made possible without requiring any inconvenient resetting of the machine when changing from one direction of movement to the other. Furthermore the elimination of backlash is effected automatically corresponding to the direction of movement and speed at any time so that particular attention of the operator is not necessary and mistakes of operation are avoided. Furthermore, by mere operation of a handle, the machine can be changed over from one mode of milling to another, thus from similar directional to counter-directional milling.

I claim as my invention:

1. Mechanism for eliminating backlash in screw driven machine parts, comprising a screw shaft, a main screw nut having its threads engaging those of the screw shaft, one of said parts being connected to the machine part to be driven, an auxiliary nut disposed non-rotatably relative to the main nut and having its threads engaging the threads of the shaft and also having a range of axial movement relatively to the movement thereon, and power means exerting a force on said auxiliary nut along the axis of said screw shaft, said power means being reversible to cause said force to move said auxiliary nut in either direction from the said point and including a lever arm, means for determining the direction of said axial movement, and two springs and two abutments rigidly connected to each other, the said springs operating in different directions and engaging an end of the said lever arm, and the abutments being adjustable as a unit in the direction of action of the springs.

2. Mechanism for eliminating backlash in screw driven machine parts, comprising a screw shaft, a main screw nut having its threads engaging those of the screw shaft, one of said parts being connected to the machine part to be driven, an auxiliary nut disposed non-rotatably relative to the main nut and having its threads engaging the threads of the shaft and also having a range of axial movement relatively to the main nut, power means exerting a force on said auxiliary nut along the axis of said screw shaft, said power means being reversible to cause said force to move said auxiliary nut in either direction and including a movable member, means for determining the direction of said axial movement, and selectively-controllable springs engaging the said movable member for actuating it in either of two opposite directions.

3. Mechanism for eliminating backlash in screw driven machine parts, comprising a screw shaft, a main screw nut having its threads engaging those of the screw shaft, one of said parts being connected to the machine part to be driven, an auxiliary nut disposed non-rotatably relative to the main nut and engaging the threads of the shaft and having a range of axial movement relatively to the main nut, power means exerting a force on said auxiliary nut along the axis of said shaft, said power means being reversible to cause said force to move said auxiliary nut in either direction away from and towards the main nut, and a regulating device for said power means for adjusting the strength of said force exerted by said power means.

4. A mechanism according to claim 3, in which a transmission device is provided whereby the power means acts on the auxiliary nut by means of the transmission device, said transmission device comprising a double-armed lever having arms of unequal length wherein the arm of shorter length is positively connected to the auxiliary nut and the longer arm engages the power means.

5. A mechanism according to claim 3, in which means is provided to automatically adjust the force exerted by the power means on the auxiliary nut to a smaller or greater magnitude or to put it out of action during the adjusting of the drive to a smaller or greater speed.

6. A mechanism according to claim 3, in which the power means comprises a pair of cylinders and a double acting piston in said cylinders, and in which a fluid pressure system, including a control member, a regulator and a variable transmission means are provided whereby the transmission means is brought into connection with the regulator for varying the magnitude of the force exerted by the power means on the auxiliary nut whereby on shifting the transmission means the magnitude of the force exerted by the power means on its engagement with the auxiliary nut is automatically varied.

7. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, power means exerting a force on said auxiliary nut to move said auxiliary nut along the axis of said shaft relative to the main nut, and a force-multiplying power transmission device provided between said power means and said auxiliary nut so that the force exerted by said transmission device on said auxiliary nut will be greater than the force exerted by said power means on said transmission device.

8. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, power means exerting a force on said auxiliary nut along the axis of said shaft, said power means being reversible to cause said force to move said auxiliary nut in either direction away from and towards the main nut, and a force multiplying power transmission device provided between said power means and said auxiliary nut so that the force exerted by said transmission device on said auxiliary nut will be greater than the force exerted by said power means on said transmission device.

9. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, power means exerting a force on said auxiliary nut along the axis of said shaft, said power means being reversible to cause said force to move said auxiliary nut in either direction away from and towards the main nut, a power transmission device provided between said power means and said auxiliary nut so that the force exerted by said transmission device on said auxiliary nut will be greater than the force exerted by said power means on said transmission device, and a regulating device for said power means for adjusting the strength of said force exerted on said transmission device by said power means.

10. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, spring means exerting a force on said auxiliary nut along the axis of said shaft, said spring means being reversible to cause said force to move said auxiliary nut in either direction away from and towards the main nut, and a regulating device for said spring means for adjusting the strength of said springs.

11. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, spring means exerting a force on said auxiliary nut along the axis of said shaft to move said auxiliary nut relative to the main nut, a regulating device for adjusting the strength of the force exerted by said spring means, and a transmission device provided between said spring means and said auxiliary nut so that the force exerted by said transmission device on said auxiliary nut will be greater than the force exerted by said spring means on said transmission device.

12. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, a hydraulically operated piston operatively connected with said auxiliary nut to move said auxiliary nut along the axis of said shaft relative to the main nut, a power fluid supply, a control member for selectively connecting one of the sides of said piston to said power fluid supply, and a regulating valve to adjust the pressure of said fluid supply acting on said piston.

13. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, an electromagnetic device operatively connected with said auxiliary nut to move said auxiliary nut along the axis of said shaft relative to the main nut, a control member for connecting said electro-magnetic device with the current, and a regulating device to adjust the intensity of the current so that the force exerted by the said electromagnetic device on the auxiliary nut is variable.

14. Mechanism for eliminating backlash in screw driven machine parts, comprising a screw shaft, a main screw nut having its threads engaging those of the screw shaft, one of said parts being connected to the machine part to be driven, an auxiliary nut engaging the threads of the shaft and having a range of axial movement relatively to the main nut, an electromagnetic device operatively connected with said auxiliary nut to move said auxiliary nut along the axis of said shaft relative to the main nut, a control member for connecting said electromagnetic device with the current, a regulating device to adjust the intensity of the current so that the force exerted by the said electromagnetic device on the auxiliary nut is variable, and a transmission device provided between said electromagnetic device and said auxiliary nut so that the force exerted by said transmission device on said auxiliary nut will be greater than the force exerted by said electromagnetic device on said transmission device.

FELIX EISELE.